(No Model.)

H. SNYDER.
FEED BOX.

No. 496,068. Patented Apr. 25, 1893.

Witnesses:
A. Humphreys
R. Bloom

Inventor:
Hiram Snyder
By his Attorney
P. H. Gunckel

UNITED STATES PATENT OFFICE.

HIRAM SNYDER, OF MINNEAPOLIS, MINNESOTA.

FEED-BOX.

SPECIFICATION forming part of Letters Patent No. 496,068, dated April 25, 1893.

Application filed March 25, 1892. Serial No. 426,348. (No model.)

*To all whom it may concern:*

Be it known that I, HIRAM SNYDER, a citizen of the United States, residing at Minneapolis, in the county of Hennepin and State of Minnesota, have invented certain new and useful Improvements in Feed-Boxes for Horses, which the following is a specification.

My invention relates to feed-regulating devices for horses and other animals. It is the object of the invention to provide a device by which the animal itself causes a limited supply of feed to pass into a box to which it has access while feeding.

The device, generally stated, consists of a box having a hinged bottom or other device which operates a pawl to control a feed roll and cause feed to be doled from the hopper into the box.

My improvements are illustrated in the accompanying drawings in which

Figure 1:
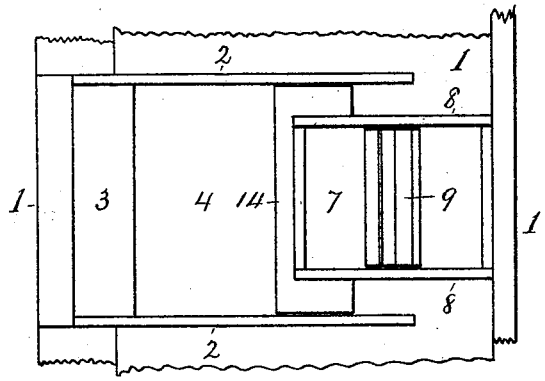
Figure 2:
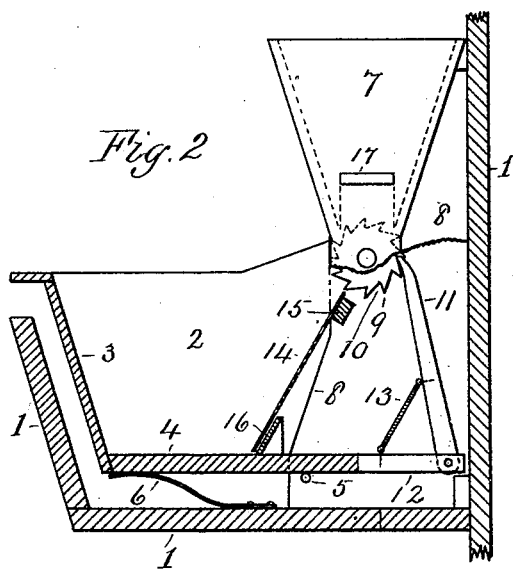
Figure 3:
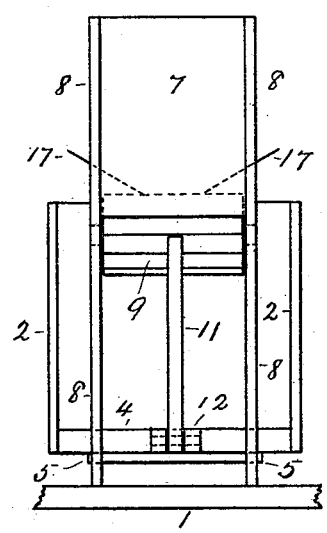
Figure 4:
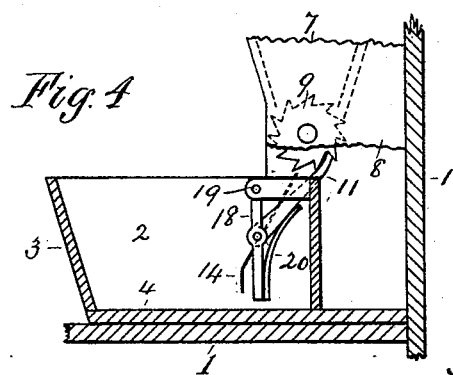

Figure 1, is a plan view of the device; Fig. 2, a longitudinal section; and Fig. 3 a rear elevation. Fig. 4, shows a modification.

In said drawings 1 designates a manger or other support for the devices of the improvement. In the manger is placed a box consisting of sides 2, a front end 3 and a bottom 4, and is supported by pivots 5 on which it can be tilted. The front end may be held in elevation by a spring 6 or by a weight provided at the rear of the pivotal points. Over the rear portion of the box is a feed-hopper 7, which may be supported by side pieces 8, extending to the bottom of the manger and the pivots 5 for supporting the box may be journaled in these side pieces; or the hopper and tilting box may be supported in any other convenient way.

At the base of the hopper is a feed roll 9 having corrugations 10, or otherwise adapted to feed oats, corn or other food for animals. A pawl 11, pivoted to an arm 12 at the rear of the bottom of the box and pressed forward by the tension of a spring 13, is arranged to engage the corrugations at the rear side of the feed roll to turn it. If desired the pawl may be made to engage the teeth of a ratchet wheel at either end of the feed roll to serve a like purpose. Thus, when the forward end of the box is depressed the pawl will be lifted so as to give the feed-roll a partial rotation (equal to the space of one or more corrugations), and feed from the hopper will descend at the front of the roll and fall on a cant-board 14 provided to direct it to the proper place on the forward portion of the box-bottom 4. This cant-board may be supported by a bar 15 having its ends attached to the side pieces 8; and on the bottom of the box there may be attached an inclined board 16 to prevent feed from passing in rear of the cant-board.

The quantity of grain carried down by the roll may be regulated by any suitable device; I have shown slides 17 passed through slots in the ends of the feed hopper and arranged to be moved inward or outward, so as to shorten the working surface of the feed roll.

In use, oats or other feed being provided in the hopper and a small quantity placed on the bottom of the box, a horse or other animal in endeavoring to take up the feed in sight will unavoidably depress the forward portion of the box sufficiently to cause the operation of the pawl and in consequence the descent of another small portion of feed. So with each attempt of the animal to take up the feed in view, the device will be operated to supply another small portion to the box and at no time will there be enough accessible to permit the animal to waste feed either by bolting it or throwing it out of the box.

In Fig. 4, a modified construction of the device is shown, in which the bottom of the box is fixed and the pawl for operating the feed roll is attached to a board 18 suspended by pivots 19 from the top of the box and having a spring 20 which bears against the pawl to hold it in engagement. The arrangement should be such that a portion of the feed will lie close to the pendent board, so that the animal in attempting to get the feed in sight will swing the board toward the rear and cause the operation of the feed roll.

Having described my invention, what I claim is—

1. In a feed-box for animals, a hopper, a feed-roll at the bottom thereof, a tilting platform for receiving the feed and a pawl connected thereto for operating the feed roll, substantially as set forth.

2. In a feed-box for animals, a hopper, a corrugated feed-roll at the bottom thereof, a tilting platform for receiving the feed, a pawl connected to the platform for operating the feed-roll, and a spring or weight for releasing the platform when tilted, substantially as set forth.

3. In a feed-box for animals, a stationary hopper, a feed-roll therein, a pivoted platform for receiving the feed, a pawl connected with its rear end for operating the feed-roll when the platform is tilted, and means for returning the platform and pawl to initial position, substantially as set forth.

HIRAM SNYDER.

Witnesses:
R. BLOOM,
P. H. GUNCKEL